United States Patent
Kishore et al.

(10) Patent No.: US 7,711,934 B2
(45) Date of Patent: May 4, 2010

(54) PROCESSOR CORE AND METHOD FOR MANAGING BRANCH MISPREDICTION IN AN OUT-OF-ORDER PROCESSOR PIPELINE

(75) Inventors: Karagada Ramarao Kishore, Saratoga, CA (US); Kjeld Svendsen, San Jose, CA (US); Vidya Rajagopalan, Palo Alto, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 11/261,654

(22) Filed: Oct. 31, 2005

(65) Prior Publication Data

US 2007/0101110 A1 May 3, 2007

(51) Int. Cl.
*G06F 15/00* (2006.01)
(52) U.S. Cl. .................... 712/233; 712/23; 712/234; 712/216
(58) Field of Classification Search .............. 712/210
See application file for complete search history.

(56) References Cited

U.S. PATENT DOCUMENTS

| | | |
|---|---|---|
| 5,091,851 A | 2/1992 | Shelton et al. |
| 5,109,520 A | 4/1992 | Knierim |
| 5,325,511 A | 6/1994 | Collins et al. |
| 5,493,523 A | 2/1996 | Huffman |
| 5,493,667 A | 2/1996 | Huck et al. |
| 5,510,934 A | 4/1996 | Brennen et al. |
| 5,526,504 A | 6/1996 | Hsu et al. |
| 5,537,538 A | 7/1996 | Bratt et al. |
| 5,546,545 A | 8/1996 | Rich |
| 5,568,630 A | 10/1996 | Killian et al. |

(Continued)

FOREIGN PATENT DOCUMENTS

| | | |
|---|---|---|
| GB | 2322718 A | 9/1998 |
| WO | WO 02/082278 A1 | 10/2002 |

OTHER PUBLICATIONS

Intel Architecture Software Developer's Manual, vol. 1, 2, 3, 1999. p. 2-7, 2-10, 2-11, 2-12, 3-329,9-16, A-10, A-20.*

(Continued)

*Primary Examiner*—Henry W. H. Tsai
*Assistant Examiner*—Cheng-Yuan Tseng
(74) *Attorney, Agent, or Firm*—Sterne, Kessler, Goldstein & Fox, PLLC

(57) ABSTRACT

A processor core and method for managing branch misprediction in an out-of-order processor pipeline. In one embodiment, the pipeline of the processor core includes a front-end instruction fetch portion, a back-end instruction execution portion, and pipeline control logic. Operation of the instruction fetch portion is decoupled from operation of the instruction execution portion. Following detection of a control transfer misprediction, operation of the instruction fetch portion is halted and instructions residing in the instruction fetch portion are invalidated. When the instruction associated with the misprediction reaches a selected pipeline stage, instructions residing in the instruction execution portion of the pipeline are invalidated and the flow of instructions from the instruction fetch portion to the instruction execution portion of the processor pipeline is restarted. A mispredict instruction identification checker and instruction identification tags are used to determine if a control transfer instruction is permitted to redirect instruction fetching.

16 Claims, 9 Drawing Sheets

U.S. PATENT DOCUMENTS

| | | | |
|---|---|---|---|
| 5,572,704 | A | 11/1996 | Bratt et al. |
| 5,586,278 | A | 12/1996 | Papworth et al. |
| 5,604,909 | A | 2/1997 | Joshi et al. |
| 5,604,912 | A | 2/1997 | Iadonato et al. |
| 5,606,683 | A | 2/1997 | Riordan |
| 5,632,025 | A | 5/1997 | Bratt et al. |
| 5,670,898 | A | 9/1997 | Fang |
| 5,734,881 | A | 3/1998 | White et al. |
| 5,740,402 | A | 4/1998 | Bratt et al. |
| 5,758,112 | A | 5/1998 | Yeager et al. |
| 5,764,999 | A | 6/1998 | Wilcox et al. |
| 5,765,037 | A | 6/1998 | Morrison et al. |
| 5,781,753 | A | 7/1998 | McFarland et al. |
| 5,784,584 | A | 7/1998 | Moore et al. |
| 5,799,165 | A | 8/1998 | Favor et al. |
| 5,799,167 | A | 8/1998 | Lesartre |
| 5,802,339 | A | 9/1998 | Sowadsky et al. |
| 5,802,386 | A | 9/1998 | Kahle et al. |
| 5,809,326 | A | 9/1998 | Nogami |
| 5,809,336 | A | 9/1998 | Moore et al. |
| 5,864,707 | A | 1/1999 | Tran et al. |
| 5,881,257 | A | 3/1999 | Glass et al. |
| 5,884,061 | A | 3/1999 | Hesson et al. |
| 5,954,815 | A | 9/1999 | Joshi et al. |
| 5,961,629 | A | 10/1999 | Nguyen et al. |
| 5,966,734 | A | 10/1999 | Mohamed et al. |
| 6,044,478 | A | 3/2000 | Green |
| 6,076,159 | A | 6/2000 | Fleck et al. |
| 6,079,014 | A | 6/2000 | Papworth et al. |
| 6,085,315 | A | 7/2000 | Fleck et al. |
| 6,216,200 | B1 | 4/2001 | Yeager |
| 6,223,278 | B1 | 4/2001 | Morrison |
| 6,247,124 | B1 | 6/2001 | Joshi et al. |
| 6,249,862 | B1 | 6/2001 | Chinnakonda et al. |
| 6,266,755 | B1 | 7/2001 | Yeager |
| 6,269,436 | B1 * | 7/2001 | Tran et al. ............ 712/23 |
| 6,289,442 | B1 | 9/2001 | Asato |
| 6,298,438 | B1 | 10/2001 | Thayer et al. |
| 6,304,960 | B1 * | 10/2001 | Yeh et al. ............ 712/236 |
| 6,308,252 | B1 | 10/2001 | Agarwal et al. |
| 6,393,550 | B1 | 5/2002 | Fetterman |
| 6,430,655 | B1 | 8/2002 | Courtright et al. |
| 6,473,837 | B1 | 10/2002 | Hughes et al. |
| 6,477,639 | B1 | 11/2002 | Krishnan et al. |
| 6,505,285 | B1 | 1/2003 | Rabinovici et al. |
| 6,546,477 | B1 | 4/2003 | Russo et al. |
| 6,557,127 | B1 | 4/2003 | Adams et al. |
| 6,594,728 | B1 | 7/2003 | Yeager |
| 6,598,148 | B1 | 7/2003 | Moore et al. |
| 6,691,221 | B2 | 2/2004 | Joshi et al. |
| 6,757,817 | B1 | 6/2004 | Booth |
| 6,760,835 | B1 | 7/2004 | Yu |
| 6,801,997 | B2 * | 10/2004 | Joy et al. ............ 712/229 |
| 6,836,833 | B1 | 12/2004 | Kinter et al. |
| 6,915,395 | B1 | 7/2005 | Singh |
| 7,028,165 | B2 * | 4/2006 | Roth et al. ............ 712/216 |
| 7,032,226 | B1 | 4/2006 | Nemirovsky et al. |
| 7,401,205 | B1 | 7/2008 | Dally et al. |
| 2002/0174322 | A1 | 11/2002 | Kruckemyer |
| 2004/0193858 | A1 | 9/2004 | Ahmad et al. |
| 2005/0102483 | A1 | 5/2005 | Kinter et al. |
| 2006/0095732 | A1 | 5/2006 | Tran et al. |
| 2006/0149904 | A1 | 7/2006 | Mowry |
| 2006/0259747 | A1 | 11/2006 | Gonzalez et al. |
| 2007/0101111 | A1 | 5/2007 | Svendsen et al. |

OTHER PUBLICATIONS

Flynn et al. Using Simple Tools to Evaluate Complex Architectural Trade-Offs, p. 67-75, IEEE Micro, 2000.*

Hennessy et al., *Computer Architecture A Quantitative Approach*, 2003, Morgan Kaufmann, 3rd, pp. 608-609.*

Hennessy, *Computer Architecture*, 2003, Morgan Kaufmann, 3rd, pp. A20-A26, A38, D1-D24.*

ADSP-21535 Blackfin™ DSP Brochure, Analog Devices, Inc., 4 pages (2001).

*Andes R10000 User's Manual*, Revision 2.0, MIPS Technologies, Inc., Entire Text (Sep. 19, 1996).

Arvind, A. and Maessen, J.-W., "Memory Model = Instruction Reordering + Store Atomicity," *ACM SIGARCH Computer Architecture News*, vol. 34, Issue 2, pp. 29-40 (May 2006).

Banakar, R. et al., "Scratchpad Memory: A Design Alternative for Cache On-chip memory in Embedded Systems," *Proceedings of CODES '02*, ACM, Estes Park, Colorado, pp. 73-78 (May 2002).

Bellas, N. et al., "Architectural and Compiler Techniques for Energy Reduction in High-Performance Microprocessors," *IEEE Trans. on Very Large Scale Integration (VLSI) Systems*, vol. 8, No. 3, pp. 317-326 (Jun. 2000).

Bird, P.L. et al., "The Effectiveness of Decoupling," *Proceedings of the 7th Int'l Conference on Supercomputing*, 1993, pp. 47-56, ACM Press, New York, NY.

Bratt, J.P. et al., U.S. Appl. No. 08/168,094, filed Dec. 15, 1993, entitled "Superscalar Microprocessor Instruction Pipeline Including Instruction Dispatching and Kill Control".

Buti, T.N. et al., "Organization and implementation of the register-renaming mapper for out-of-order IBM POWER4 processors," *IBM J. Res. & Dev.* 49(1):167-188, International Business Machines Corporation (Jan. 2005).

Cotterell, S. and Vahid, F., "Tuning of Loop Cache Architecture to Programs in Embedded System Design," *ISSS'02*, 6 pages (Oct. 2002).

Courtright, D., "Introducing: The MIPS32™ 4Kc™ and MIPS32™ 4Kp™ Processor Cores 'Jade'," paper copy of slide presentation distributed at the Embedded Microprocessor Forum, pp. 1-25 (May 1999).

Dally, W.J. et al., U.S. Appl. No. 09/637,500, filed Aug. 11, 2000, entitled "High Performance RISC Instruction Set Digital Signal Processor Having Circular Buffer And Looping Controls".

De Vries, H., *Understanding the detailed Architecture of AMD's 64 bit Core*, 85 pages, printed Oct. 16, 2007 from http://chip-architect.com/news/2003_09_21_Detailed_Architecture_of_AMDs_64bit_Core.html (Sep. 21, 2003).

Fukuoka, K. et al., "Leakage Power Reduction for Clock Gating Scheme on PD-SOI," *IEEE Computer Society Int'l Symp. on Circuits and Systems*, pp. 613-616 (2004).

Goodman, J.R. et al., "PIPE: A VLSI Decoupled Architecture," *ACM SIGARCH Computer Architecture News*, Jun. 1985, pp. 20-27, ACM Press, New York, NY.

Gwennap, L., "MIPS R10000 Uses Decoupled Architecture," *Microprocessor Report*, vol. 8, No. 14, pp. 1-5 (Oct. 24, 1994).

Gwennap, L., "MIPS R12000 to Hit 300 MHz," *Microprocessor Report*, vol. 11, No. 13, pp. 1-4 (Oct. 6, 1997).

Gwennap, L., "MIPS Roadmap Focuses on Bandwidth," *Microprocessor Report*, pp. 1-3 (May 12, 1997).

Gwennap, L., "SGI Provides Overview of TFP CPU," *Microprocessor Report*, vol. 7, No. 2, pp. 1-2 (Feb. 15, 1993).

Gwennap, L., "TFP Designed for Tremendous Floating Point," *Microprocessor Report*, vol. 7, No. 11, pp. 1-5 (Aug. 23, 1993).

*Intel Architecture Software Developer's Manual*—vol. 2: Instruction Set Reference, Intel. Corporation, pp. 3-278 and 3-279 (1997).

*Intel® StrongARM® SA-1100 Microprocessor Developer's Manual*, Intel. Corporation, pp. i-xix, 1-1 through 1-7, 2-1 through 2-8, and 6-1 through 6-7 (Aug. 1999).

Kandemir, M. et al., "Dynamic Management of Scratch-Pad Memory Space," *Proceedings of the 38th Design Automation Conference*, ACM, Las Vegas, Nevada, pp. 690-695 (Jun. 2001).

Kandemir, M. et al., "Exploiting Scratch Pad Memory Using Presburger Formulas," *Proceedings of ISSS '01*, ACM, Montreal, Quebec, Canada, pp. 7-12 (Oct. 2001).

Kandemir, M. et al., "Exploiting Shared Scratch Pad Memory Space in Embedded Multiprocessor Systems," *Proceedings of the 39th Design Automation Conference*, ACM, New Orleans, Louisiana, pp. 219-224 (Jun. 2002).

Kiyohara, T. et al., "Register Connection: A New Approach to Adding Registers into Instruction Set Architectures," *Int'l Conf. on Computer Architecture—Proc. of the 20th Annual Int'l. Symp. on Computer Architecture*, San Diego, CA, pp. 247-256 (1993).

Krewell, K., "Intel Looks To Core For Success", Microprocessor Report, vol. 20, Mar. 2006, pp. 1, 4, 5 and 6.

Lee, L.H. et al., "Instruction Fetch Energy Reduction Using Loop Caches For Embedded Applications with Small Tight Loops," *ISLPED'99*, pp. 267-269 (1999).

Lipasti, M. et al., "Physical Register Inlining," at <http://www.ece.wisc.edu/~pharm/papers/isca2004_egunadi.pdf>, 11 pages (retrieved Jun. 12, 2006).

Merten, M.C. et al., "Modulo Schedule Buffers", IEEE, pp. 138-149 (Dec. 2001).

*MIPS R10000 Microprocessor User's Manual, Version 2.0*, MIPS Technologies, Inc., 424 pages (Jan. 29, 1997).

Nass, R., "Latest DSPs Poised to Drive 3G Revolution," *Portable Design* 8(9):26, 27, 28, 32, and 34, PennWell Corporation, Fair Lawn, New Jersey (Sep. 2001).

Nemirovsky, M. et al., U.S. Appl. No. 09/602,279, filed Jun. 23, 2000, entitled "Methods and Apparatus for Background Memory Management".

Osborne, M. et al., "Superscalar Pipeline Architectures," Slide Presentation, 37 pages, downloaded Jun. 19, 2007 from http://www.academic.marist.edu/~jzbv/architecture/projects2004/SuperscalarArchitectures.ppt (Apr. 19, 2004).

Panda, P. et al., "Data Memory Organization and Optimizations in Application-Specific Systems," *IEEE Design & Test of Computers*, IEEE, pp. 56-68 (May 2001).

Panda, P. et al., "Efficient Utilization of Scratch-Pad Memory in Embedded Processor Applications," *Proceedings of the European Design & Test Conference ED &TC 97*, IEEE, Paris France, pp. 7-11 (Mar. 1997).

Peng, M. and Azgomi, S., "Content-Addressable memory (CAM) and its network applications," at http://www.eetasia.com/ARTICLES/2000MAY/2000MAY03_MEM_NTEK_TAC.PDF, 3 pages (retrieved Jun. 12, 2006).

Pierce, J. and Mudge, T., "Wrong-Path Instruction Prefetching," *IEEE Computer Society 29th Int'l. Symp. on Microarchitecture*, pp. 165-175 (1996).

Price, C., *MIPS R10000 MIPS IV ISA Manual: Andes*, Revision 3.2, MIPS Technologies, Inc., 323 pages (Sep. 1995).

Rhodes, S., *MIPS R8000 Microprocessor Chip Set User's Manual*, Revision 3.0, Silicon Graphics, Inc., 352 pages (Jul. 1994).

Schmidt, D.C., "Transparently Parameterizing Synchronization into a Concurrent Distributed Application: A Case Study of C++ Design Evolution," *C++ Report*, SIGS Publications, vol. 6, No. 3, 10 pages (Jul.-Aug. 1994).

Smith, J.E. et al., "The ZS-1 Central Processor," *Proceedings of the Second Int'l Conference on Architectural Support for Programming Languages and Operating Systems*, 1987, pp. 199-204, IEEE Computer Society Press, Los Alamitos, CA.

Smith, J.E., "Retrospective: Decoupled Access/Execute Computer Architectures," *25 Years of the international Symposia on Computer Architecture (Selected Papers)*, Jun. 1998, pp. 27-28, ACM Press, New York, NY.

Solomon, B. et al., "Micro-Operation Cache: A Power Aware Frontend for Variable Instruction Length ISA," *Symp. on Low Power Electronics and Design*, pp. 4-9 (Aug. 2001).

*SPARC64 V Processor for UNIX Server*, Revision 1.0, Fujitsu Limited, 24 pages (Aug. 2004).

Sung, M. et al., "Multithreading Decoupled Architectures for Complexity-Effective General Purpose Computing," *ACM SIGARCH Computer Architecture News* vol. 29—Issue 5, Dec. 2001, pp. 56-61, ACM Press, New York, NY.

Taylor, M., *The Raw Prototype Design Document*, Dept. of Electrical Engineering and Computer Science—Massachusetts Institute of Technology, pp. 1, 5, 6, 10, and 53 (Nov. 1999).

$V_R$Series™ *User's Manual:V $_R$10000™ Microprocessor*, Version 1.0, NEC, Entire Text (Nov. 1995).

Watts, C. et al., "ARM Intelligent Energy Manager Future Evolution," paper copy of slide presentation distributed at the ARM Developers' Conference '04, 34 sheets (Oct. 2004).

Yeager, K.C., "The MIPS R10000 Superscalar Microprocessor," *IEEE Micro*, pp. 28-40 (1996).

International Search Report and Written Opinion, dated Aug. 6, 2007, for PCT Appl. No. PCT/US2006/041614, 10 pages.

Office Communication, dated Feb. 26, 2008, for U.S. Appl. No. 11/261,655, filed Oct. 31, 2005, 13 pages.

Office Communication, dated Oct. 27, 2008, for U.S. Appl. No. 11/261,655, filed Oct. 31, 2005, 13 pages.

International Preliminary Report on Patentability, dated May 6, 2008, for PCT Appl. No. PCT/US2006/041614, 6 pages.

Barbacci, M.R., "Instruction Set Processor Specifications For Simulation, Evaluation, and Synthesis," *Proceedings of the 16th Conference on Design Automation*, pp. 64-72, IEEE Press, San Diego, CA, 1979.

*Hardware description language*, 6 pages, retrieved from http://en.wikipedia.org/wiki/Hardware_description_language, last modified on May 10, 2009.

Office Communication, dated Aug. 11, 2009, for U.S. Appl. No. 11/261,655, filed Oct. 31, 2005, 13 pages.

Maner, Walter, "Unique Ethical Problems in Information Technology," *Science and Engineering Ethics*, vol. 2, No. 2, Apr. 1996, pp. 137-154.

\* cited by examiner

PROCESSOR CORE AND METHOD FOR MANAGING BRANCH MISPREDICTION IN AN OUT-OF-ORDER PROCESSOR PIPELINE

CROSS REFERENCE TO RELATED APPLICATIONS

This application is related to commonly owned U.S. application Ser. No. 11/261,655, filed on Oct. 31, 2005, entitled "Processor Core And Method For Managing Program Counter Redirection In An Out-Of-Order Processor Pipeline," which is incorporated herein by reference in its entirety.

FIELD OF THE INVENTION

The present invention relates generally to microprocessors. More particularly, it relates to a microprocessor having an out-of-order processor pipeline.

BACKGROUND OF THE INVENTION

Processor pipelining is a known technique used to make microprocessors operate more quickly. This technique enables a microprocessor to work on different steps of an instruction at the same time and thereby take advantage of parallelism that exists among the steps needed to execute an instruction. As a result, a microprocessor can execute more instructions in a shorter period of time.

Many microprocessors, especially those used in the embedded market, are relatively simple in-order machines. As a result, they are subject to data hazard stalls. More complex microprocessors have out-of-order pipelines, which allow execution of instructions to be scheduled around hazards that would stall an in-order processor pipeline.

Speculation is used to resolve branch instructions and predict whether a conditional branch is taken or not taken in an out-of-order machine. When a branch resolution results in a misprediction, all younger instructions in a program stream must be cleared from the pipeline. Conventionally, this is accomplished using an age-based comparison technique across the entire processor pipeline. While this conventional technique works for its intended purpose, it requires maintaining and updating a number of register renaming maps, especially in microprocessors that employ a pipeline having a large number of processing stages.

What is needed is a new technique for clearing an out-of-order pipeline of a microprocessor following a branch misprediction, which overcomes the deficiencies noted above.

BRIEF SUMMARY OF THE INVENTION

The present invention provides a processor core and a method for managing branch misprediction in an out-of-order processor pipeline. In one embodiment, the pipeline of the processor core includes a front-end instruction fetch portion, a back-end instruction execution portion, and pipeline control logic. Operation of the instruction fetch portion is decoupled from operation of the instruction execution portion. Following detection of a control transfer misprediction, at least one signal generated in the instruction execution portion of the processor pipeline causes pipeline control logic to clear/invalidate instructions residing in the instruction fetch portion and halt the flow of instructions from the instruction fetch portion to the instruction execution portion of the pipeline. Operation of the instruction execution portion continues until the control transfer instruction associated with the misprediction reaches a selected stage of the instruction execution portion of the processor pipeline. When the instruction associated with the misprediction reaches the selected stage, pipeline control logic clears/invalidates instructions residing in the instruction execution portion of the pipeline. The flow of instructions from the instruction fetch portion to the instruction execution portion of the processor pipeline is restarted after pipeline control logic clears/invalidates instructions residing in the instruction execution portion of the processor pipeline.

In one embodiment, an instruction fetch portion of a pipeline of a processor core according to the present invention includes a program counter selector, an instruction buffer, and a branch predictor. The program counter selector selects addresses/program counter values used to fetch instructions from memory. If a fetched instruction is a control transfer instruction such as, for example, a branch instruction or a jump instruction, the branch predictor predicts whether a conditional branch associated with the instruction is taken or not taken. The instruction buffer stores fetched instructions until they are selected for execution by an instruction execution portion of the pipeline.

In one embodiment, an instruction execution portion of a pipeline of a processor core according to the present invention includes an instruction decoder, an instruction identification generator, a buffer, an arithmetic logic unit, and a mispredict instruction identification checker. The instruction decoder decodes instructions read from an instruction buffer. The instruction identification generator associates or assigns instruction identification tags to instructions. The instruction identification tags are used by the mispredict instruction identification checker to determine a program order of a first control transfer instruction relative to a second control transfer instruction. The buffer of the instruction execution portion of the pipeline stores decoded instructions until they are executed by the arithmetic logic unit. If a decoded instruction is a control transfer instruction such as, for example, a branch instruction or a jump instruction, the arithmetic logic unit determines whether a branch prediction made by a branch predictor residing in an instruction fetch portion of the pipeline is correct. If the prediction is incorrect, the mispredict instruction identification checker compares the instruction's identification tag to an identification tag and/or a valid bit stored in a register of the mispredict instruction identification checker to determine if the instruction is permitted to redirect the instruction fetch portion of the pipeline.

In one embodiment of the present invention, the processor core is capable of executing instructions from multiple program threads.

In one embodiment of the present invention, the processor core is capable of executing instructions having different bit-widths (e.g., instructions having 16-bits, 32-bits, et cetera).

In one embodiment of the present invention, the processor core includes a pipeline that includes multiple parallel processing paths.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification illustrate the present invention and together with the description further serve to explain the principles of the invention and to enable a person skilled in the pertinent art to make and use the invention. In the drawings, like reference numbers indicate identical or functionally similar elements. Additionally, the left-most digit of the reference number indicates a drawing in which the reference number first appears.

DETAILED DESCRIPTION OF THE INVENTION

The present invention provides a processor core and a method for managing branch misprediction in an out-of-order processor pipeline. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
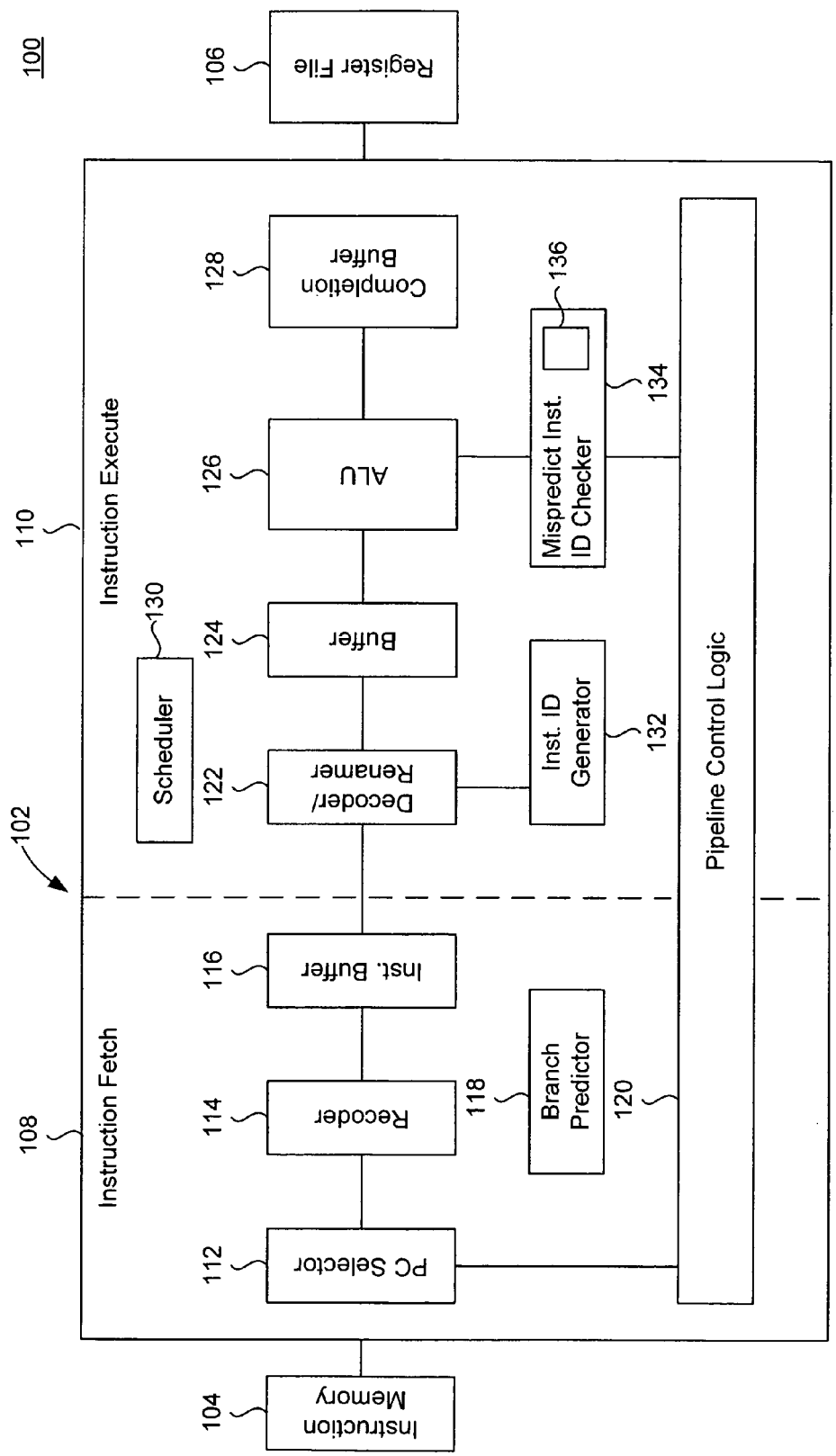
FIG. 1 is a diagram of a processor core according to a first embodiment of the present invention.

FIG. 1 is a diagram of a microprocessor 100 according to an embodiment of the present invention. Microprocessor 100 includes a processor core 102, instruction memory 104, and a register file 106. Processor core 102 has a pipeline that includes an instruction fetch portion 108 and an instruction execution portion 110.

As shown in FIG. 1, instruction fetch portion 108 of processor core 102 includes a program counter (PC) selector 112, an optional recoder 114, and an instruction buffer 116. Instruction fetch portion 108 also includes a branch predictor 118 and a portion of pipeline control logic 120.

Program counter selector 112 selects an address or program counter value to be used to fetch a program instruction from memory. In one embodiment, PC selector 112 can select a sequentially incremented program counter value, a redirect program counter value, or a program counter value for a new program thread. PC selector 112 receives one or more signals generated by pipeline control logic 120 and/or a mispredict instruction identification checker 134, which cause PC selector 112 to select a redirect program counter value following a branch misprediction associated with a control transfer instruction.

Processor core 102 is preferably capable of executing both a standard width instruction (e.g., a 32-bit instruction) and a compressed-format width instruction (e.g., a 16-bit instruction). Accordingly, in one embodiment, processor core 102 includes optional recoder 114. If a compressed-format instruction is fetched from instruction memory 104, it is recoded by recoder 114 to a format width that can be decoded by decoder/renamer 122 and executed by arithmetic logic unit 126. In one embodiment, both standard width instructions and compressed-format width instructions are recoded by recoder 114 to an instruction width having more bits than a standard width instruction. Instructions are passed from optional recoder 114 to instruction buffer 116.

Instruction buffer 116 is capable of holding multiple instructions. In one embodiment, in which processor core 102 implements multithreading, instructions from different program threads are stored, for example, in separate portions of instruction buffer 116. Multithreading refers to an ability of an operating system to execute different parts of a program, called threads, simultaneously. In another embodiment, in which processor core 102 implements multithreading, instructions from different program threads are stored in separate instruction buffers, for example, one instruction buffer for each program thread.

In instances where a control transfer instruction such as, for example, a branch instruction or a jump instruction, is fetched from instruction memory 104, branch predictor 118 predicts whether a conditional branch associated with the control transfer instruction is taken or not taken. Any known branch prediction algorithm can be used. In one embodiment, branch predictor 118 includes a branch prediction table that is used in predicting whether a conditional branch is taken or not taken.

Instruction fetch portion 108 of processor core 102 preferably fetches multiple instructions per fetch cycle.

Instruction execution portion 110 of processor core 102 includes a decoder/renamer 122, a buffer 124, an arithmetic logic unit (ALU) 126, and a completion buffer 128. A scheduler 130 dynamically schedules instructions for execution by instruction execution portion 110 of processor core 102. Also included in instruction execution portion 110 are an instruction identification generator 132, a mispredict instruction identification checker 134 that includes a register 136, and a portion of pipeline control logic 120.

Instructions are read from instruction buffer 116 and decoded by decoder/renamer 122. Decoder/renamer 122 performs the functions of decoding instructions and updating a register renaming map (not shown). During the decoding/renaming process, each instruction is associated with/assigned an instruction identification tag. The instruction identification tags are generated by instruction identification generator 132.

In one embodiment, the instruction identification tags are sequentially generated multi-bit values. The number of bits that are generated is dependent on how many instructions are executed simultaneously within instruction execution portion 110 of processor core 102. In one embodiment, in which processor core 102 performs multithreading, instruction identification tags are generated and assigned on a per thread basis.

Instructions are read from buffer 124 and executed by arithmetic logic unit 126 in accordance with a schedule determined by scheduler 130. Scheduler 130 schedules instructions for execution once their operands are ready and preferably in accordance with their age. Results in arithmetic logic unit 126 are written to completion buffer 128 and stored until instructions graduate and their results are written to register file 106. The register renaming map (not shown) is updated when an instruction graduates. As will be understood by persons skilled in the relevant arts given the description herein, the present invention eliminates the need to save multiple renaming map states, which are required by conventional out-of-order processors for every renamed instruction.

During execution of a control transfer instruction such as, for example, a branch instruction or a jump instruction, arithmetic logic unit 126 determines whether a branch prediction made by branch predictor 118 is correct. If the prediction is incorrect, mispredict instruction identification checker 134 compares the instruction's identification tag to an identification tag and/or a valid bit stored in register 136 of mispredict instruction identification checker 134 to determine if the instruction is permitted to redirect instruction fetch portion 108 of processor core 102. As described in more detail below, if the result of the comparison indicates that the control transfer instruction was issued out-of-program-order relative to a second control transfer instruction that mispredicted, and that is awaiting graduation, then mispredict instruction identification checker 134 will enable the control transfer instruction currently being considered to redirect instruction fetching.

Instruction memory 104 is any memory accessible to processor core 102 such as, for example, an instruction cache, a scratch pad, a loop buffer, et cetera. In one embodiment, memory 104 includes multiple memories and/or multiple types of memories.

Register file 106 includes a plurality of general purpose registers (not shown), which are visible to a programmer.

Operation of instruction fetch portion 108 of the pipeline of processor core 102 is decoupled from operation of instruction execution portion 110. Following detection of a conditional branch/control transfer misprediction, at least one signal generated in instruction execution portion 110 causes pipeline control logic 120 to clear/invalidate instructions residing in instruction fetch portion 108. Additionally, the flow of instructions from instruction fetch portion 108 to instruction execution portion 110 of the pipeline is halted. Operation of instruction execution portion 110 continues until a control transfer instruction associated with a misprediction reaches a selected stage of instruction execution portion 110 of the processor pipeline. When the instruction associated with the misprediction reaches the selected stage, pipeline control logic 120 clears/invalidates instructions residing in instruction execution portion 110. The flow of instructions from instruction fetch portion 108 to instruction execution portion 110 is enabled/restarted after pipeline control logic 120 clears/invalidates instructions residing in instruction execution portion 110 of the pipeline.

In one embodiment, in which processor core 102 performs multithreading, pipeline control logic 120 only clears/invalidates instructions belonging to the program thread associated with the misprediction. Instructions are cleared/invalidated, for example, by changing a valid bit or tag associated with each instruction to indicate that the instructions are no longer valid instructions. Invalid instruction are prevented from writing their results to register file 106.

Figure 2:
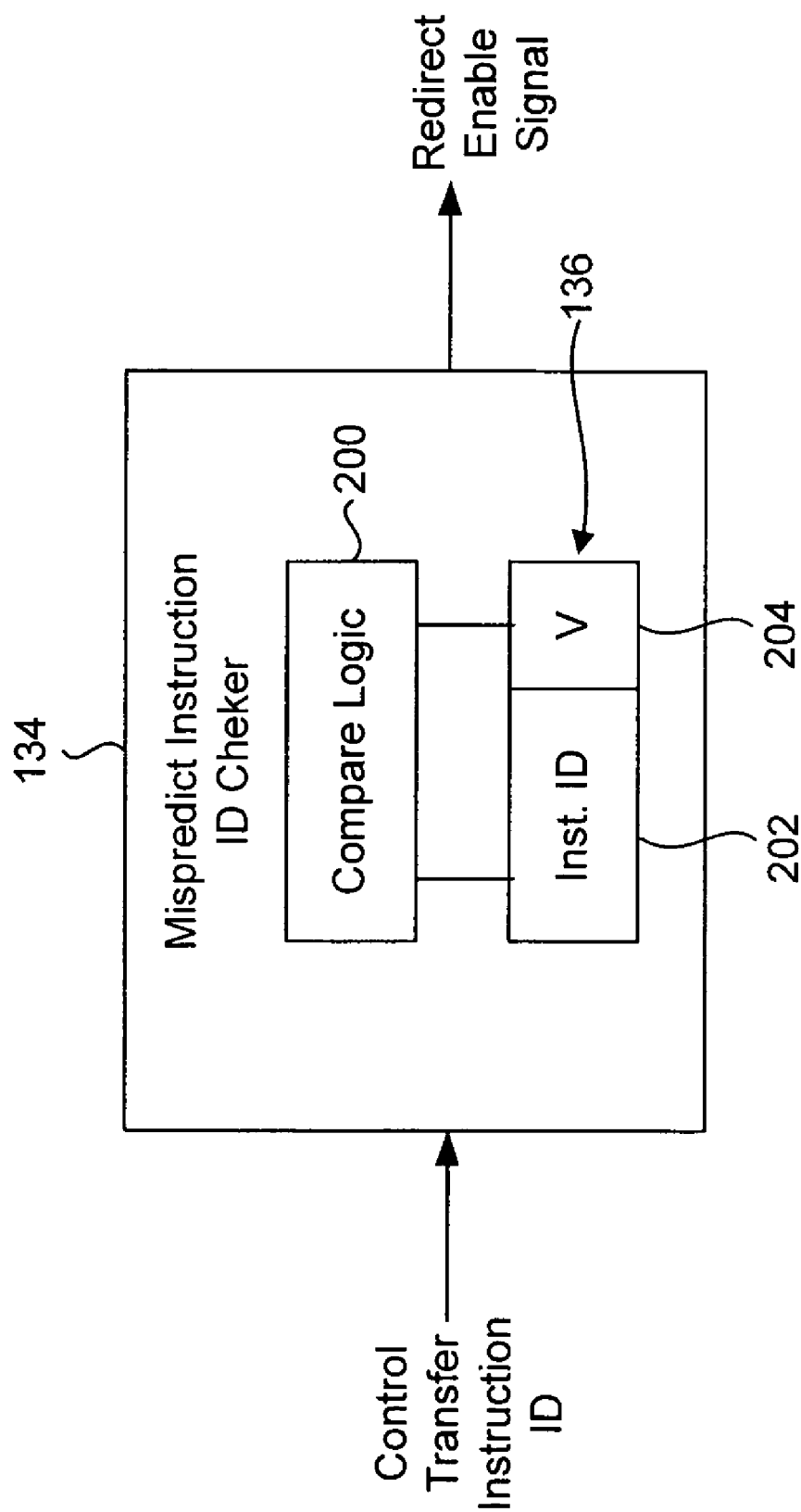
FIG. 2 is a diagram of a mispredict instruction identification checker according to an embodiment of the present invention.

FIG. 2 is a more detailed diagram of mispredict instruction identification checker 134. As shown in FIG. 2, mispredict instruction identification checker 134 includes compare logic 200 and a register 136 that includes an instruction identification tag portion 202 and a valid portion 204. In one embodiment, in which processor core 102 supports multithreading, a register 136 is maintained for each program thread.

Mispredict instruction identification checker 134 is used to determine whether a current control transfer instruction being executed by arithmetic logic unit 126 is permitted to redirect instruction fetch portion 108 of the pipeline of processor core 102. In one embodiment, following detection of a conditional branch misprediction associated with the current control transfer instruction, compare logic 200 of mispredict instruction identification checker 134 compares the instruction identification tag of the current control transfer instruction to values residing in register 136 of mispredict instruction identification checker 134. If the valid portion 204 of register 136 is set (e.g., contains a valid bit equal to one), register 136 contains the instruction identification tag of an earlier executed control transfer instruction that was involved in a branch misprediction and that has not yet graduated. In this case, if the current control transfer instruction is determined to precede the earlier control transfer instruction in program order, based on the instruction identification tag comparison, register 136 is updated to contain the instruction identification tag of the current control transfer instruction and the current control transfer instruction is permitted to redirect instruction fetching. If however the earlier control transfer instruction is determined to precede the current control transfer instruction in program order, register 136 is not updated to contain the instruction identification tag of the current control transfer instruction, and the current control transfer instruction does not redirect instruction fetching. If the valid portion 204 of register 136 is reset (e.g., contains a valid bit equal to zero), the instruction identification tag of the current control transfer instruction is stored in register 136 and the current control transfer instruction is permitted to redirect instruction fetch portion 108.

When a control transfer instruction graduates and its instruction identification tag is stored in register 136, the valid portion 204 of register 136 is reset so that a control transfer instruction occurring later in program order will be permitted to redirect instruction fetching following detection of a branch misprediction. In one embodiment, if an instruction identification tag of a graduating control transfer instruction matches the identification tag held in register 136, a valid bit in register 136 is reset/cleared.

Generally speaking, when a conditional branch misprediction associated with a control transfer instruction is detected by arithmetic logic unit 126, the control transfer instruction should be permitted to redirect instruction fetching. This is not the case, however, if the control transfer instruction (e.g., instruction BNE-2 shown in FIG. 5) follows in program order another control transfer instruction (e.g., instruction BNE-1 shown in FIG. 5) that has redirected instruction fetching but that has not yet graduated. Assuming that both control transfer instructions (BNE-1 and BNE-2) belong to a single program thread, redirection by the second control transfer instruction (BNE-2) is not required and should be suppressed.

The operation of processor core 102 will now be described in more detail with reference to FIGS. 3-5. As will become apparent to persons skilled in the relevant art(s) given the description herein, the present invention permits an early restart of instruction fetch operations following a branch misprediction. The present invention also eliminates any need for an explicit age-based comparison of instructions across the entire pipeline of a microprocessor and the need for maintaining multiple renaming map states.

Figure 3:
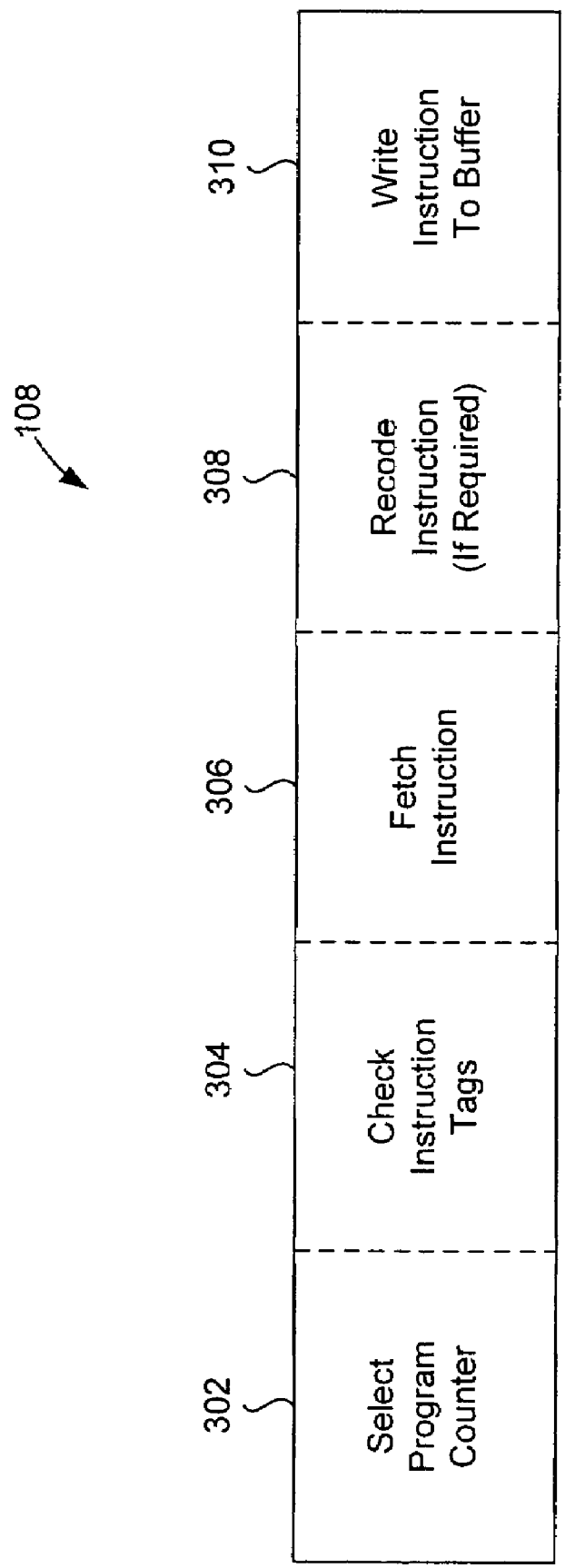
FIG. 3 is a diagram of an instruction fetch portion of a processor pipeline according to an embodiment of the present invention.

FIG. 3 is a diagram illustrating one embodiment of instruction fetch portion 108 of processor core 102. In the embodiment shown in FIG. 3, instruction fetch portion 108 includes five pipeline stages. These five pipeline stages are illustrative and not intended to limit the present invention. In other embodiments, instruction fetch portion 108 can have more or less than 5 pipeline stages. The number of pipeline stages that are implemented in any embodiment of the present invention is a design choice.

As shown in FIG. 3, the five pipeline stages of instruction fetch portion 108 are stage 302 (select program counter), stage 304 (check instruction tags), stage 306 (fetch instruction), stage 308 (recode instruction if required), and stage 310 (write instruction to instruction buffer).

In stage 302, PC selector 112 selects amongst a variety of program counter values to be used to fetch an instruction from instruction memory 104. In one embodiment, the program counter value selected can be the program counter value of a new program thread, the next sequential program counter value for an existing program thread, or a redirect program counter value associated with a branch instruction or a jump instruction.

In stage 304, the instruction tags associated with an instruction to be fetched from instruction memory 104 are checked. In one embodiment, the instruction tags contain precode bits for each instruction indicating instruction type. If these precode bits indicate that an instruction is a control transfer instruction, a branch history table is accessed and used to determine whether the control transfer instruction is likely to branch or likely not to branch.

In stage 306, one or more instructions are fetched from instruction memory 104. In one embodiment, if a fetched control transfer instruction is predicted as not likely to branch, computation of a conditional branch target address for the instruction is started during stage 306.

In stage 308, any compressed-format instructions are recoded into a format that can be decoded and executed by instruction execution portion 110 of processor core 102. For example, in one embodiment in which processor core 102 executes both 16-bit instructions and 32-bit instructions, any 16-bit compressed-format instructions are recoded by recoder 114 to form instructions having 32 bits. In another embodiment, recoder 114 recodes both 16-bit instructions and 32-bit instructions to a format having more than 32 bits.

In stage 310, instructions are written to instruction buffer 116. In one multithreading embodiment, processor core 102 includes one instruction buffer for each program thread. In this embodiment, instructions associated with a particular program thread are written into an instruction buffer reserved for the particular program thread. In one embodiment, stage 310 can be bypassed and instructions can be dispatched directly to decoder/renamer 122.

Figure 4:
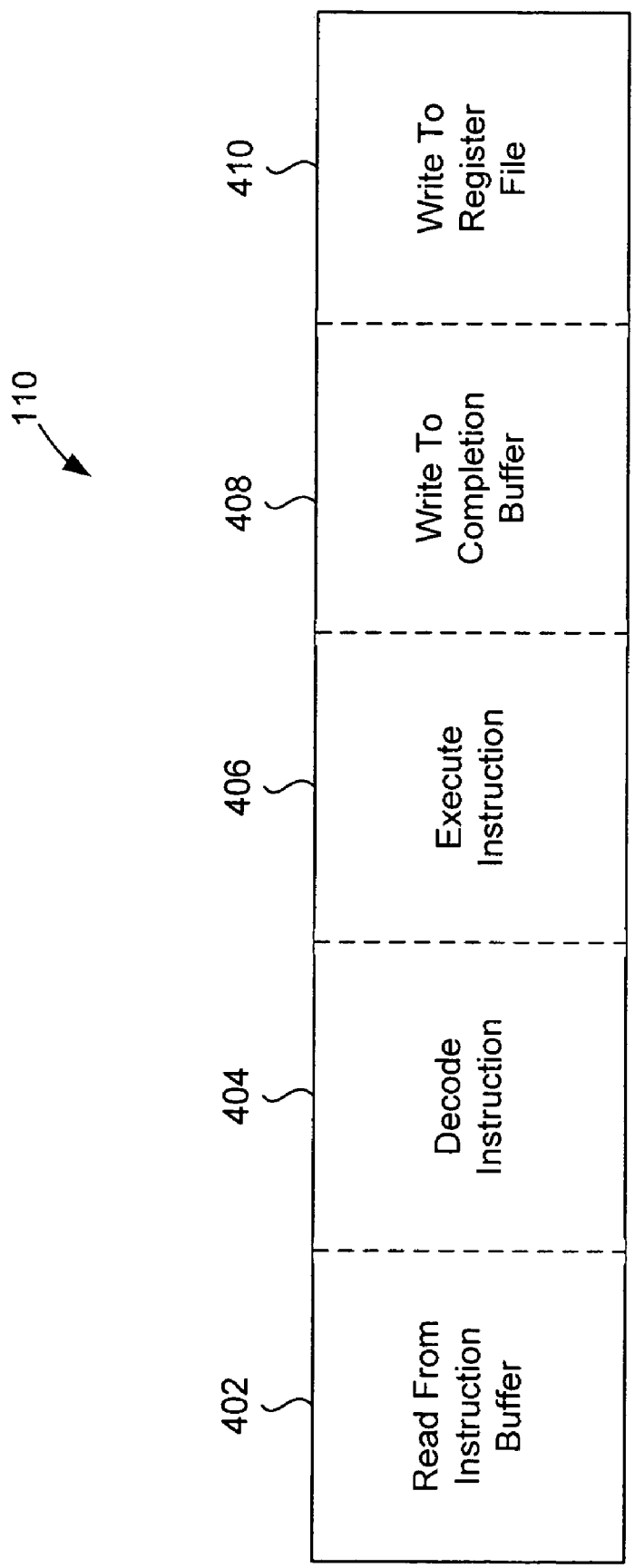
FIG. 4 is a diagram of an instruction execution portion of a processor pipeline according to an embodiment of the present invention.

FIG. 4 is a diagram illustrating one embodiment of instruction execution portion 110 of processor core 102. In the embodiment shown in FIG. 4, instruction execution portion 110 includes five pipeline stages. These five pipeline stages are illustrative and not intended to limit the present invention. Other embodiments have more or less than five pipeline stages.

As shown in FIG. 4, the five pipeline stages of instruction execution portion 110 are stage 402 (read from instruction buffer), stage 404 (decode instruction), stage 406 (execute instruction), stage 408 (write to completion buffer), and stage 410 (write to register file).

In stage 402, instructions are read from instruction buffer 116. In one embodiment that uses delay slots following a branch instruction, a branch instruction and its delay slot are always read together in stage 402. As described herein, following resolution of a branch misprediction, the ability to read instructions from instruction buffer 116 may be temporarily halted until selected instructions residing within instruction execution portion 110 of the pipeline are cleared/invalidated by pipeline control logic 120.

In stage 404, instructions are decoded. In parallel with decoding, register renaming map(s) are updated and used to determine whether required source operands are available, for example, in register file 106 and/or completion buffer 128. A register renaming map is a structure that holds the mapping information between programmer visible architectural registers and internal physical registers. Register renaming map(s) indicate whether data is available and where data is available. In one embodiment, the register renaming map(s) also include an active bit that indicates whether a latest producer, if there is one, of a corresponding general purpose register has been issued into the pipeline or not. In one embodiment, in which processor core 102 includes accumulation registers, a separate renaming map is maintained for the accumulation registers. This renaming map is similar to the renaming map maintained for general purpose registers.

Instructions in stage 404 receive a completion buffer identification tag and an instruction identification tag. The completion buffer identification tag determines the location in completion buffer 128 where arithmetic logic unit 126 can write calculated results for an instruction. In one embodiment, each instruction identification tag is a thread-specific sequentially generated value that uniquely determines the program order of instructions residing in instruction execution portion 110 of processor core 102. At the end of stage 404, decoded instructions are placed in buffer 124. Scheduler 130 then selects instructions residing in buffer 124 for execution by arithmetic logic unit 126.

In stage 406, instructions are executed by arithmetic logic unit 126 and control transfer instructions such as, for example, branch instructions and jump instructions are resolved. For control transfer instructions, resolved paths are compared against predicted paths. If a misprediction has occurred, and redirection is required, the correct address is provided to instruction fetch portion 108 of processor core 102, the branch history table is updated, and instruction fetch portion 108 is redirected to start fetching instructions from the redirect address (program counter value). In one embodiment, selected instructions such as, for example, floating point instructions are processed by a coprocessor (not shown) coupled to arithmetic logic unit 126.

In one embodiment of the present invention, an adder in the arithmetic logic unit 126 is used to compute both a target address and a fall through address. Arithmetic logic unit 126 compares the branch outcome and determines the direction of the branch, which is compared to the predicted direction. If there is a misprediction, the instruction execution portion 110 signals instruction fetch portion 108 of the misprediction and provides instruction fetch portion 108 with the correct prediction. In embodiments of the present invention, depending on the type of control transfer instruction involved in a misprediction, instruction fetch portion 108 may either immediately restart fetching, stall until pipeline control logic 120 invalidates selected instructions in the pipeline once the control transfer instruction involved in the misprediction reaches a selected stage in the pipeline (e.g., upon instruction graduation), or instruction fetch portion 108 may stall and wait for a restart signal from instruction execution portion 110. In each case, the control transfer instruction involved in the misprediction is preferably marked mispredicted, and it continues to flow through the pipeline eventually carrying this status to completion buffer 128.

Because branch instructions can be issued out-of-order in instruction execution portion 110, mispredict instruction identification checker 134 keeps track of the instruction identification tag of the last redirected branch. If a new resolution results in a mispredict, the identification tag of the new branch instruction is compared against the identification tag of the last redirected branch that has not yet graduated. If the program order of the new branch is prior to the previous branch, the instruction fetch portion 108 is redirected according to the new branch instruction. Register indirect jumps, which have been predicted with a return stack are also compared against the real register value in stage 406. If there is a mispredict, the correct target is sent to instruction fetch portion 108.

The results of branch decisions are prioritized and communicated to instruction fetch portion 108 of the pipeline during stage 406. In addition to the branch redirects, there can be redirects from graduating instructions. These redirects are prioritized over the branch redirects and a final redirect is forwarded to PC selector 112 of instruction fetch portion 108 via pipeline control logic 120. A valid redirect will cause instruction fetch portion 108 to clear/invalidate its current fetch stream of all instructions in instruction fetch portion 108 associated with the redirect. A new fetch is started with the newly received target address.

In stage 408, results generated by arithmetic logic unit 126 and/or a coprocessor are written to completion buffer 128. As noted above, instructions that are accepted into instruction execution portion 110 of processor core 102 are assigned a completion buffer identification number.

In one embodiment, the assignment of completion buffer identification numbers is done using a free list. The free list contains as many entries as the number of entries in each completion buffer. In one embodiment, up to two entries can be read from and written to the free list, for example, every cycle during normal operation. Following a branch mispredict, however, all the entries may be released and data written into the free list. Additionally, in multithreading embodiments, particular program threads can be released and data written into the free list without effecting entries for other program threads. Because of this requirement, the free list preferably is not implemented as a simple stack.

In one embodiment, the free list is implemented using a bitmap to represent the entries in completion buffer 128. A first bit of the bitmap indicates whether the completion buffer entry is either available (e.g., if the bit has a value of one) or unavailable (e.g., if the bit has a value of zero). In a multithreading embodiment, if completion buffer identification numbers are assigned regardless of a thread content to which an instruction belongs, instruction identification tags are preferably assigned on a per thread basis. In one embodiment, an instruction identification tag is assigned to all incoming instructions regardless of whether the instructions write to a destination register.

Assigned completion buffer identification numbers are written into a graduation first-in, first-out buffer at a location identified by a write pointer and/or a write pointer plus an offset value. Completion buffer completion bits associated with newly renamed instructions are reset/cleared to indicate incomplete results. As instructions complete execution, their corresponding completion buffer completion bits are set, thereby enabling the instructions to graduate and release their associated completion buffer identification numbers. Pipeline control logic 120 ensures that one thread content does not consume more than its share of completion buffer entries.

In one embodiment of the present invention, separate structures are used to hold the program counter and other attributes of instructions that need not be piped along with the instruction at every stage of the processor pipeline. One such structure is a program counter completion buffer, which can be implemented as a field in completion buffer 128 and managed using read and write pointers.

As noted herein, register renaming is done for destination registers to remove output dependencies and to ensure there is a single producer of a given register in processor core 102 at any given time. The source registers are renamed so that data is obtained from a producer at the earliest opportunity instead of waiting for the processor core's architectural state to be updated. This also aids in reducing dependency check complexity in any coprocessor coupled, for example, to arithmetic logic unit 126.

In stage 410, results from completion buffer 128 are written to register file 106 as instructions graduate and register renaming map(s) are updated. Each instruction preferably graduates according to program order.

Control transfer instructions such as, for example, branch instructions and jump instructions require special processing in order to allow these instructions to graduate in program order. As noted herein, control transfer instructions are preferably resolved during stage 406 of the processor pipeline. However, some control transfer instructions such as, for example, some branch instructions cannot be resolved until stage 410 because of a need for an architectural condition evaluation. Coprocessor conditional branch instructions, for example, are evaluated at graduation. This is due to the fact that arithmetic logic unit 126 may not have access to floating point generated information. In case of a misprediction, the redirection program counter is read from a completion buffer written to by the floating point coprocessor. This program counter is then sent to the instruction fetch portion 108 on a mispredict.

As a part of instruction graduation, information pertaining to each instruction that is stored in completion buffer 128 and/or a graduation first-in/first-out buffer is read. The read information includes both data and status information. The data information corresponds, for example, to results calculated by arithmetic logic unit 126 and/or a coprocessor coupled to arithmetic logic unit 126. The status information includes, for example, completion status, exception information, branch resolution information, et cetera. Data read from completion buffer 128 is committed to an architecturally visible general purpose register (register file 106) if no flush and redirect due to an exception or other special case is required. If a redirect of the program counter is required, pipeline control logic 120 generates signals needed to accomplish the redirect.

In one embodiment, when a control transfer instruction reaches the head of a first-in first-out buffer, all instructions that belong to that program thread are invalidated in instruction execution portion 110 of the pipeline. The fetch instruction portion does not have to invalidate instructions that belong to the program thread at this point in time as any instruction that needed to be invalidated would have been invalidated when the misprediction was first identified.

In one embodiment of the present invention, branch likely instructions are handled differently due to their particular behavior. Instruction fetch portion 108 fetches an issued instruction according to the architectural specification. However, if there is a mispredict, instruction fetch portion 108 is required to replay the branch instruction sequence with the correct prediction. The branch is marked mispredicted, and it flows through the pipeline eventually carrying this status to completion buffer 128. When the branch instruction eventually reaches the head of a first-in first-out buffer, all instructions that belong to that program thread are invalidated in the instruction execution portion 110 of the pipeline, and redirection information (e.g., a replay address from the program counter completion buffer) is sent to instruction fetch portion 108. This causes a replay of the branch likely instruction using a corrected prediction.

Figure 5:
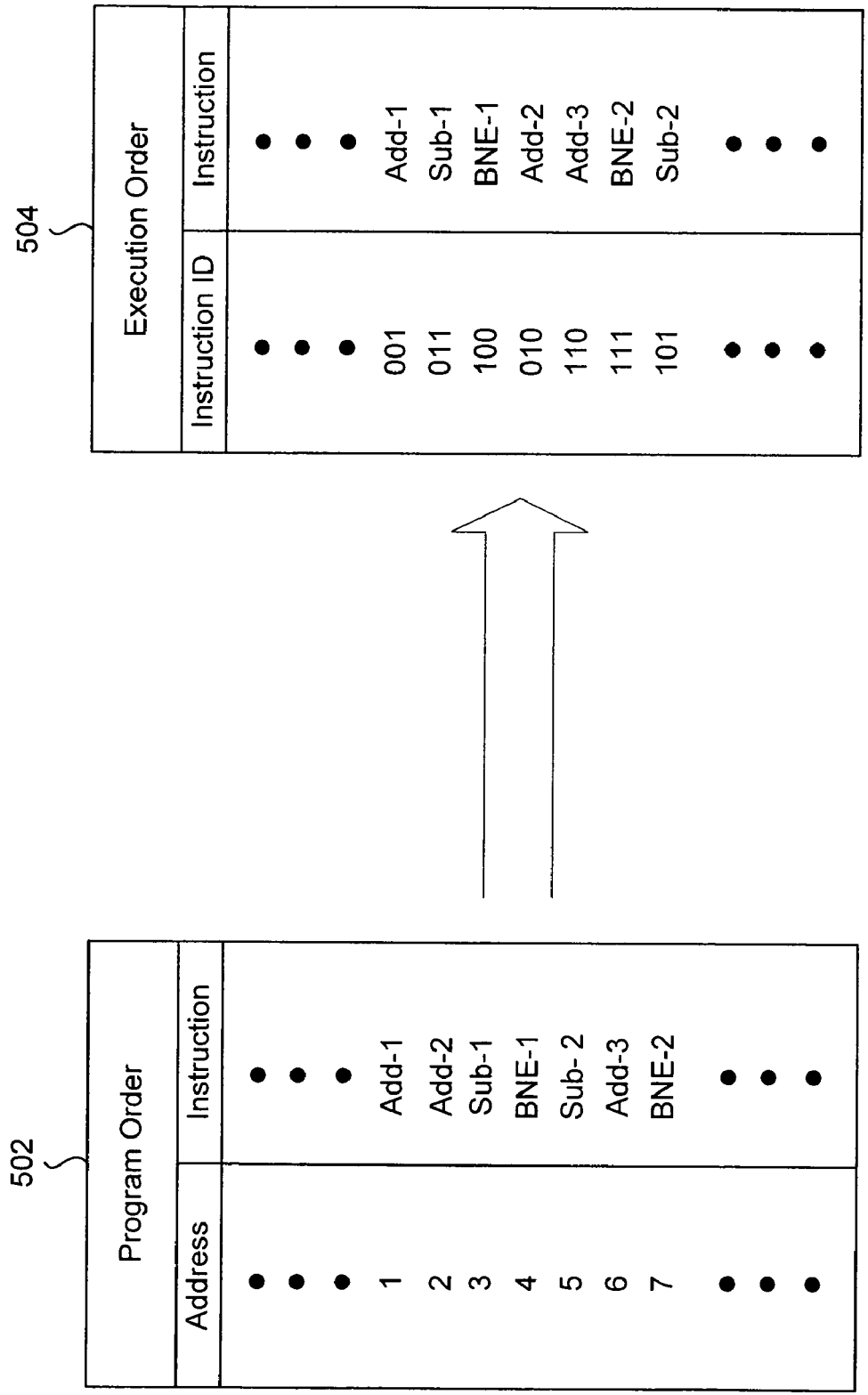
FIG. 5 is a diagram illustrating the association of instruction identification tags with instructions according to an embodiment of the present invention.

FIG. 5 illustrates two tables 502 and 504 that illustrate how instruction identification tags can be assigned to instructions in a way that allows the instruction identification tags to be used to identify a program order of one instruction relative to another instruction. Table 502 illustrates seven instructions, in program order, fetched from addresses 1 through 7. Table 504 shows a possible execution order for the same seven instructions along with assigned instruction identification tags that identify the instructions' program order.

As can be seen from a review of tables 502 and 504, there are two branch instructions. Branch-if-not-equal instruction 1 (BNE-1) and branch-if-not-equal instruction 2 (BNE-2). Due to out-of-order processing by processor core 102, two issue scenarios are possible. The two branch instructions can be issued either in-order or out-of-order. As described herein, if the branch instructions are issued in-order and both instructions are assigned incorrect branch predictions by branch predictor 118, the second branch instruction (BNE-2) should be suppressed from redirecting instruction fetch portion 108 because this branch instruction was issued incorrectly on a speculative basis and the first branch instruction (BNE-1) will have already provided instruction fetch portion 108 of the pipeline with the correct redirection.

Two method embodiments of the present invention will now be described with regards to FIGS. 6, 7A, and 7B.

Figure 6:
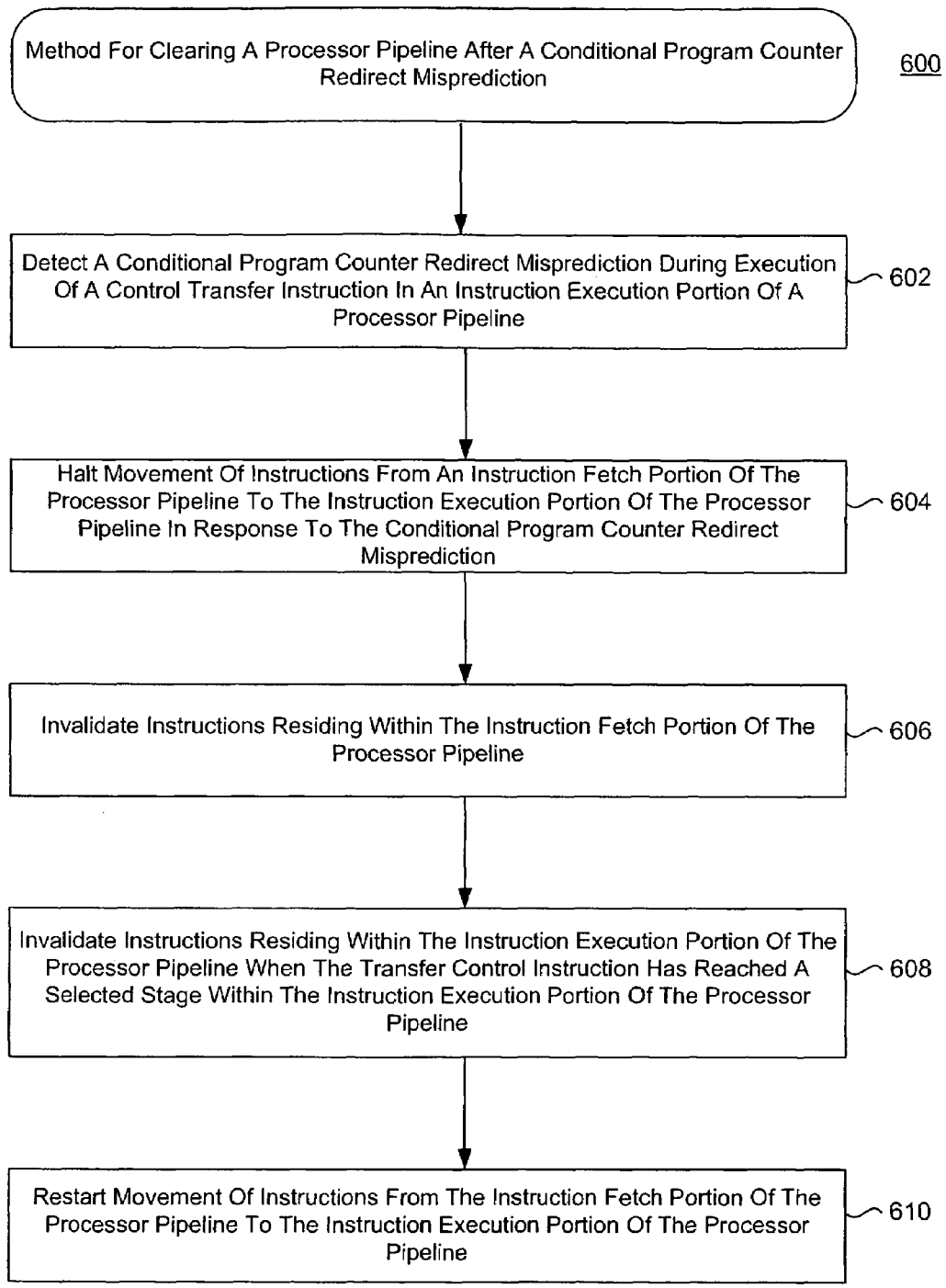
FIG. 6 is a flowchart of a method for clearing/invalidating a processor pipeline according to an embodiment of the present invention.

FIG. 6 depicts a flowchart of a method 600 for clearing a processor pipeline according to an embodiment of the present invention. As shown in FIG. 6, method 600 includes five steps 602, 604, 606, 608, and 610. Method 600 is capable of being implemented, for example, using processor core 102 described above, but it is not limited to being implemented in processor core 102.

In step 602, a conditional program counter redirect misprediction is detected during execution of a control transfer instruction. The misprediction is detected in an instruction execution portion of a processor pipeline such as, for example, instruction execution portion 110 of processor core 102 described above.

In step 604, movement of instructions from an instruction fetch portion of the processor pipeline to the instruction execution portion of the processor pipeline is halted in response to the conditional program counter redirect misprediction. Operation of the instruction fetch portion of the pipeline is decoupled from operation of the instruction execution portion of the pipeline. This allows, for example, the instruction execution portion of the pipeline to continue operating while the instruction fetch portion is halted.

In step 606, instructions residing within the instruction fetch portion of the processor pipeline are invalidated. In one embodiment, all instructions residing in the instruction fetch portion are invalidated. In another embodiment, only instructions belonging to the same program thread as the control transfer instruction associated with the misprediction are invalidated. Instructions can be invalidated, for example, by changing a validity bit associated with each instruction to show the instruction is no longer a valid instruction. Instruction fetching is preferably restarted at a redirected address as soon as instructions residing within the instruction fetch portion of the processor pipeline have been invalidated.

In step 608, once the control transfer instruction associated with the misprediction has reached a selected stage within the instruction execution portion of the processor pipeline, instructions residing within the instruction execution portion of the processor pipeline are invalidated. In one embodiment, all instructions residing in the instruction execution portion are invalidated. In another embodiment, only instructions belonging to the same program thread as the control transfer instruction associated with the misprediction are invalidated. In one embodiment, the selected stage is a stage prior to instruction graduation.

In step 610, movement of instructions from the instruction fetch portion of the processor pipeline to the instruction execution portion of the processor pipeline is restarted.

Figure 7A:
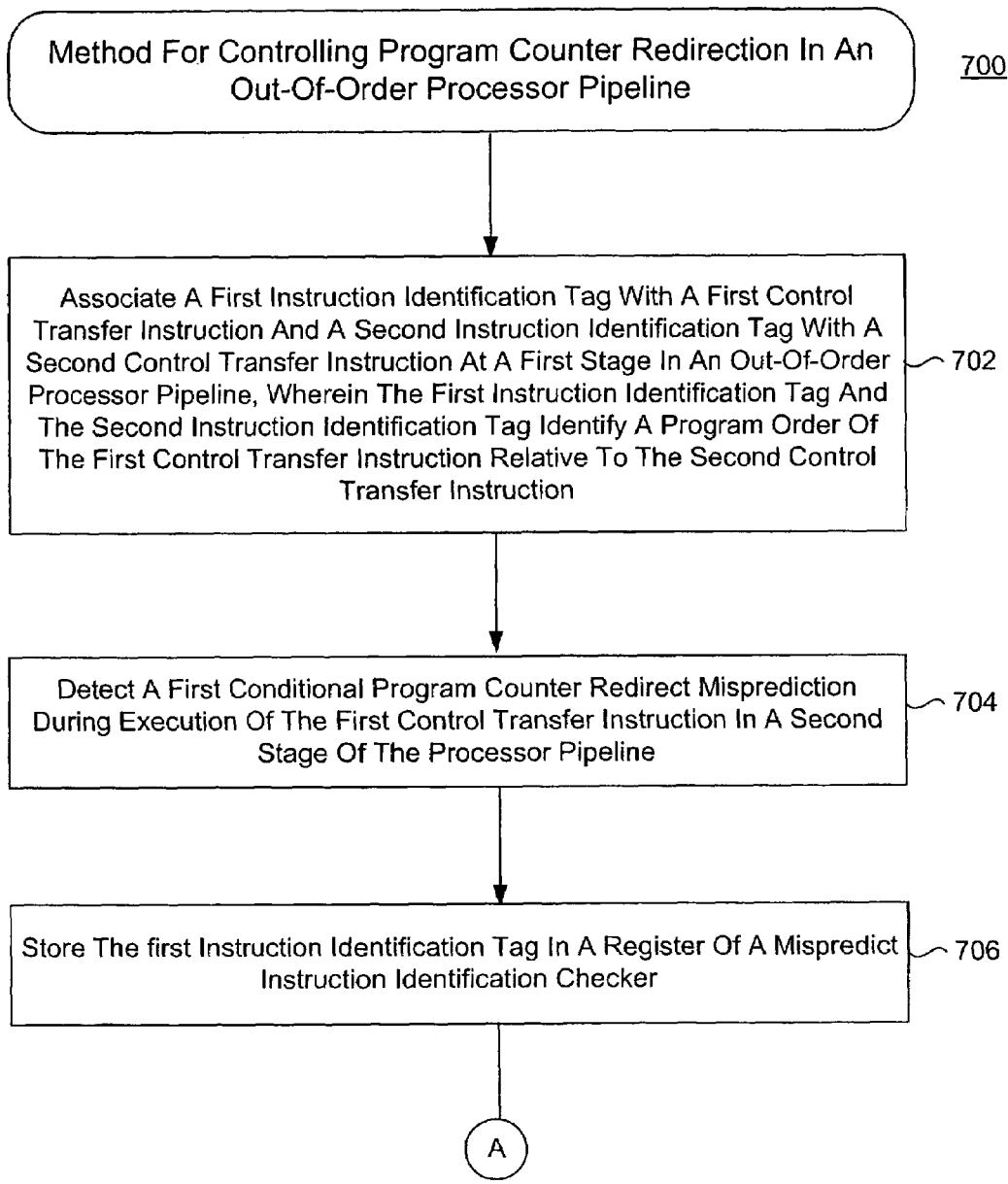
FIGS. 7A and 7B are a flowchart of a method for controlling program counter redirection in an out-of-order processor pipeline according to an embodiment of the present invention.
Figure 7B:
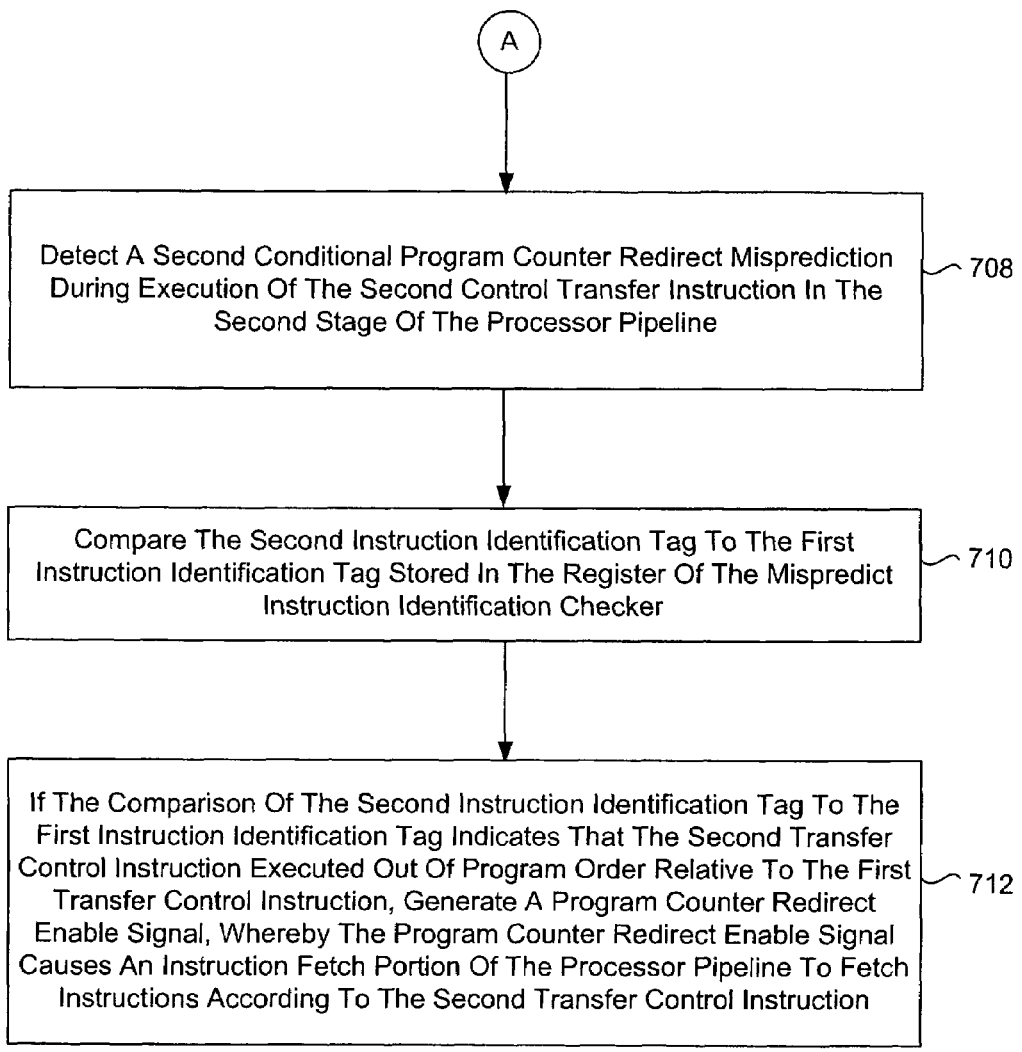

FIGS. 7A and 7B depict a flowchart of a method 700 for controlling program counter redirection in an out-of-order processor pipeline according to an embodiment of the present invention. As shown in FIGS. 7A and 7B, method 700 includes six steps 702, 704, 706, 708, 710, and 712. Method 700 is capable of being implemented, for example, using processor core 102 described above, but it is not limited to being implemented in processor core 102.

In step 702, a first instruction identification tag is associated with a first control transfer instruction and a second instruction identification tag is associated with a second control transfer instruction. These tags are associated at a first stage in an out-of-order processor pipeline. The first instruction identification tag and the second instruction identification tag identify a program order of the first control transfer instruction relative to the second control transfer instruction.

In step 704, a first conditional program counter redirect misprediction is detected during execution of the first control transfer instruction. The detection occurs in a second stage of the processor pipeline.

In step 706, the first instruction identification tag is stored in a register of a mispredict instruction identification checker.

In step 708, a second conditional program counter redirect misprediction is detected during execution of the second control transfer instruction. This second misdirection is detected in the second stage of the processor pipeline.

In step 710, the second instruction identification tag is compared to the first instruction identification tag stored in the register of the mispredict instruction identification checker.

In step 712, if the comparison of the second instruction identification tag to the first instruction identification tag indicates that the second control transfer instruction executed out of program order relative to the first control transfer instruction, a program counter redirect enable signal is generated. The program counter redirect enable signal causes an instruction fetch portion of the processor pipeline to fetch instructions according to the second control transfer instruction.

Figure 8:
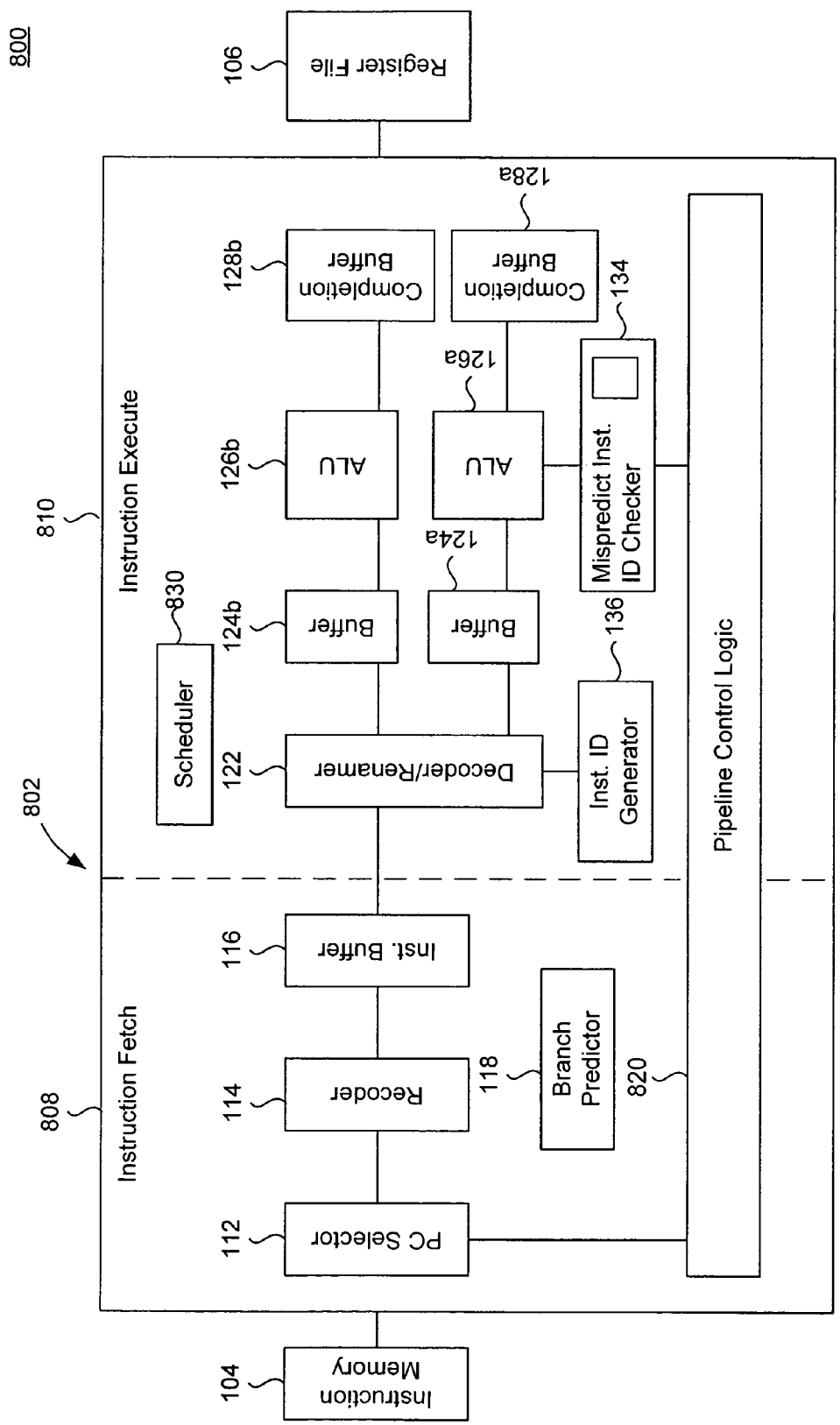
FIG. 8 is a diagram of a processor core according to a second embodiment of the present invention.

FIG. 8 is a diagram of a microprocessor 800 according to another embodiment of the present invention. Microprocessor 800 includes a processor core 802, instruction memory 104, and a register file 106. Processor core 802 has a pipeline that includes an instruction fetch portion 808 and an instruction execution portion 810.

As shown in FIG. 8, instruction fetch portion 808 of processor core 802 includes a program counter (PC) selector 112, an optional recoder 114, and an instruction buffer 116. Instruction fetch portion 808 also includes a branch predictor 118 and a portion of pipeline control logic 820.

Instruction execution portion 810 of processor core 802 includes a decoder/renamer 122, two buffers 124a and 124b, two arithmetic logic units (ALUs) 126a and 126b, and two completion buffers 128a and 128b. A scheduler 830 dynamically schedules instructions for execution by one of the two parallel pipelines of instruction execution portion 810 of processor core 802. Also included in instruction execution portion 810 are at least one instruction identification generator 132, at least one mispredict instruction identification checker 134 that includes at least one register 136, and a portion of pipeline control logic 820.

Microprocessor 800 operates similarly to microprocessor 100 except that microprocessor 800 includes two parallel instruction execution pipelines. These two instruction execution pipelines can be similar, or they can be specialized to execute selected instructions. In one embodiment, the pipeline represented by buffer 124a, arithmetic logic unit 126a, and completion buffer 128a is used to execute control transfer instructions. This eliminates the need for having more than one mispredict instruction identification checker 134.

While the foregoing is a complete description of exemplary embodiments of the invention, it should be evident that various modifications, alternatives, and equivalents may be made and used. It is also to be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A processor having an out-of-order pipeline, comprising:
   an instruction fetch portion of the pipeline;
   an instruction execution portion of the pipeline, coupled to the instruction fetch portion of the pipeline; and
   pipeline control logic, coupled to the instruction fetch portion of the pipeline and the instruction execution portion of the pipeline, wherein the pipeline control logic:
      halts movement of instructions from the instruction fetch portion of the pipeline to the instruction execution portion of the pipeline in response to a detection of a control transfer instruction misprediction resulting from a control transfer instruction comprising a control transfer instruction ID checked by a misprediction instruction ID checker;
      invalidates instructions residing within the instruction fetch portion of the pipeline;
      continues executing instructions in the instruction execution portion of the pipeline after detection of the control transfer instruction misprediction until the control transfer instruction reaches a selected stage of the instruction execution portion of the pipeline;
      invalidates instructions residing in the instruction execution portion of the pipeline once the control transfer instruction reaches the selected stage; and
      restarts transfer of instructions from the instruction fetch portion of the pipeline to the instruction execution portion of the pipeline.

2. The processor of claim 1, wherein there are a plurality of program threads, and the pipeline control logic invalidates instructions belonging to one of the plurality of program threads associated with the control transfer instruction misprediction.

3. A computer readable storage medium comprising computer-readable program code to generate a processor having an out-of-order pipeline embodied in software, the processor comprising:
   an instruction fetch portion of the pipeline;
   an instruction execution portion of the pipeline, coupled to the instruction fetch portion of the pipeline; and
   pipeline control logic, coupled to the instruction fetch portion of the pipeline and the instruction execution portion of the pipeline, wherein the pipeline control logic:
      halts movement of instructions from the instruction fetch portion of the pipeline to the instruction execution portion of the pipeline in response to a detection of a control transfer instruction misprediction resulting from a control transfer instruction comprising a control transfer instruction ID checked by a misprediction instruction ID checker;
      invalidates instructions residing within the instruction fetch portion of the pipeline;
      continues executing instructions in the instruction execution portion of the pipeline after detection of the control transfer instruction misprediction until the control transfer instruction reaches a selected stage in the instruction execution portion of the pipeline;
      invalidates instructions residing in the instruction execution portion of the pipeline once the control transfer instruction reaches the selected stage; and
      restarts transfer of instructions from the instruction fetch portion of the pipeline to the instruction execution portion of the pipeline.

4. The computer readable storage medium of claim 3, wherein the processor comprises a plurality of program threads, and the pipeline control logic invalidates instructions belonging to one of the plurality of program threads associated with the control transfer instruction misprediction.

5. The computer readable storage medium of claim 3, wherein the computer-readable program code is a hardware description language software.

6. The computer readable storage medium of claim 5, wherein the computer-readable program code is a Verilog hardware description language software.

7. The computer readable storage medium of claim 5, wherein the computer-readable program code is a VHDL hardware description language software.

8. A method for clearing an out-of-order processor pipeline after a control transfer instruction misprediction, the method comprising:
   (1) detecting a conditional program counter redirect misprediction during execution of a control transfer instruction in an instruction comprising a control transfer instruction ID checked by a misprediction instruction ID checker execution portion of a processor pipeline;
   (2) halting movement of instructions from an instruction fetch portion of the processor pipeline to the instruction execution portion of the processor pipeline in response to the detected misprediction;
   (3) invalidating instructions residing within the instruction fetch portion of the processor pipeline;
   (4) continuing to execute instructions residing within the instruction execution portion of the processor pipeline until the control transfer instruction reaches a selected stage in the instruction execution portion of the processor pipeline;
   (5) invalidating instructions in the instruction execution portion of the pipeline once the control transfer instruction reaches the selected stage; and
   (6) restarting transfer of instructions from the instruction fetch portion of the pipeline to the instruction execution portion of the pipeline.

9. The method of claim 8, wherein (1) comprises detecting a conditional program counter redirect misprediction during execution of one of a branch instruction and a jump instruction.

10. The method of claim 8, further comprising recoding at least one compressed format instruction.

11. The method of claim 8, wherein there are a plurality of program threads, and (3) comprises invalidating instructions belonging to one of the plurality of program threads associated with the control transfer instruction.

12. The method of claim 8, wherein there are a plurality of program threads, and (4) comprises invalidating instructions belonging to one of the plurality of program threads associated with the control transfer instruction.

13. A processor, comprising:
   a pipeline capable of executing instructions out of program order, the pipeline having an instruction fetch portion and an instruction execution portion, wherein the instruction fetch portion of the pipeline transfers instructions to the instruction execution portion of the pipeline; and
   pipeline control logic that
      controls the instruction fetch portion of the pipeline to halt transferring instructions to the instruction execution portion of the pipeline when the instruction execution portion of the pipeline detects a misprediction associated with a control transfer instruction comprising a control transfer instruction ID checked by a misprediction instruction ID checker,
      controls the instruction execution portion of the pipeline to continue executing instructions in the instruction execution portion of the pipeline when the misprediction is detected until the control transfer instruction reaches a selected stage in the instruction execution portion of the pipeline,
      controls the instruction execution portion of the pipeline to invalidate instructions in the instruction execution portion of the pipeline once the control transfer instruction reaches the selected stage, and
      controls the instruction fetch portion of the pipeline to restart transferring instructions to the instruction execution portion of the pipeline.

14. The processor of claim 13, wherein the pipeline control logic controls the instruction execution portion of the pipeline to invalidate only instructions in the instruction execution portion of the pipeline associated with one of a plurality of program threads.

15. The processor of claim 13, wherein the selected stage of the instruction execution portion of the pipeline is a stage prior to writing results generated by an arithmetic logic unit to a register file.

16. The processor of claim 13, wherein the processor is capable of processing variable length instructions.

* * * * *